(12) United States Patent
Sauve

(10) Patent No.: US 6,343,667 B2
(45) Date of Patent: Feb. 5, 2002

(54) ELECTRIC-POWERED SCOOTER

(76) Inventor: Dennis N. Sauve, 1060 Commerce Blvd. North, Sarasota, FL (US) 34243

( * ) Notice: Subject to any disclaimer, the term of this patent is extended or adjusted under 35 U.S.C. 154(b) by 0 days.

(21) Appl. No.: 09/780,719

(22) Filed: Feb. 12, 2001

Related U.S. Application Data

(63) Continuation-in-part of application No. 09/559,607, filed on Apr. 27, 2000, now Pat. No. 6,227,324.

(51) Int. Cl.$^7$ ........................... B62K 11/10; B62D 61/02
(52) U.S. Cl. ........................ 180/228; 180/220; 180/221; 180/181; 180/342; 180/65.1; 280/87.041; 280/87.042
(58) Field of Search .................. 280/87.041, 87.042; 180/219, 220, 221, 228, 180, 181, 342, 343, 65.1, 213, 214

(56) References Cited

U.S. PATENT DOCUMENTS

| | | | | |
|---|---|---|---|---|
| 4,418,784 A | * | 12/1983 | Fox .............................. | 180/221 |
| 4,821,832 A | * | 4/1989 | Patmont ....................... | 180/219 |
| 5,183,129 A | * | 2/1993 | Powell ......................... | 180/219 |
| 5,388,659 A | * | 2/1995 | Pepe ............................ | 180/219 |
| 5,775,452 A | * | 7/1998 | Patmont ....................... | 180/181 |
| 5,927,420 A | * | 7/1999 | Karrington .................. | 180/181 |
| 6,012,539 A | * | 1/2000 | Patmont ................. | 280/87.041 |
| 6,095,274 A | * | 8/2000 | Patmont ....................... | 180/181 |
| 6,273,205 B1 | * | 8/2001 | Tsai ............................. | 180/181 |

FOREIGN PATENT DOCUMENTS

| | | |
|---|---|---|
| DE | 35 37 522 A1 * | 4/1987 |
| DE | 42 40 439 A1 * | 6/1994 |

\* cited by examiner

*Primary Examiner*—Lanna Mai
*Assistant Examiner*—Ruth Ilan
(74) *Attorney, Agent, or Firm*—William Nitkin

(57) ABSTRACT

An electric-powered scooter is disclosed having a chassis with a platform upon which the rider stands, a front wheel mounted to provide steering control and a rear wheel rotatably mounted at the rear section of the chassis. A pedal is pivotably mounted at the rear section of the chassis and is attached to the motor and drive wheel. The pedal, in an inactive position, holds such drive wheel in a position where it does not contact the rear wheel. When the pedal is depressed by the foot of the rider, the motor is turned on and the drive wheel contacts the rear wheel, propelling the scooter forward. When released, the pedal returns automatically by spring means to its inactive position, breaking the contact of the rear wheel with the drive wheel, and automatically turning the motor off.

1 Claim, 2 Drawing Sheets

ELECTRIC-POWERED SCOOTER

This application is a continuation-in-part of my previous application entitled Electrically Powered Scooter filed Apr. 27, 2000 Ser. No. 09/559,607 now U.S. Pat. No. 6,227,324 B1.

BACKGROUND OF THE INVENTION

1. Field of the Invention

The invention herein resides in the field of electrically powered scooters and more particularly relates to a scooter having a mounted motor and drive wheel, the interconnection of which to the rear wheel is foot-activated when desired.

2. History of the Prior Art

Scooters are normally built with a steerable front wheel and a fixed back wheel rotatably mounted on a chassis having a central platform. To gain momentum, the rider stands with one foot on the platform of the scooter and pushes off the ground with the other foot to propel the scooter forward. For additional momentum, driving means of different mechanical types have been provided for transmitting force from the rider to the front or rear wheel, such as disclosed in U.S. Pat. Nos. 4,960,286 and 4,911,457. Also disclosed in U.S. Pat. No. 4,915,403 is a foot pedal mechanically geared to the rear wheel of the scooter for providing additional momentum by the rider's depression of the foot pedal to propel the scooter forward. Skateboards with battery-powered electric motors are also known. In one such embodiment, an electric motor is connected to one of the wheel's axles to rotate it by means of a belt attached to the electric motor, such as disclosed in U.S. Pat. No. 5,020,621. Although most motorized scooters employ a clutch to provide some free wheeling when the motor is turned off, there is still considerable friction and drag caused by such clutches. Because of this drag, the rider has to continuously apply power to maintain speed, thereby discharging the battery quickly.

SUMMARY OF THE INVENTION

It is an object of the present invention to provide an electric battery-powered scooter that has an easy-to-use and highly efficient mode of operation.

It is a further object of the invention to provide an electric scooter with drag-free coasting, thereby increasing travel distance between battery charges.

The electrically powered scooter of this invention includes a chassis having a front section, a central section and a rear section. In the central section of the chassis is mounted a platform upon which the rider can stand and under which platform is disposed a battery. The scooter has a front wheel mounted at the front section of the chassis to provide steering control and at least one back wheel rotatably mounted at the rear section of the chassis. The scooter is equipped with a foot-operated drive means incorporating a motor mounted on a pedal that can be shifted from an inactive position to an activated position, at the same time activating the motor which, via force transmission means, causes the back wheel to rotate. The electric motor can be placed on a side of the rider's foot-operated pedal. The pedal can have one end pivotably attached at the rear section of the chassis and in the inactivated position the force transmission means for transmitting force from the motor to the rear wheel of the scooter is mounted on the shaft of the motor where it does not contact the rear wheel. When the rider depresses the pedal, the force transmission means, being a drive wheel, contacts and drives the rear wheel. The scooter is equipped with a resilient return member adapted to urge the pedal from its depressed, activated position to an inactivated position after the rider has released foot pressure so that the drive wheel no longer contacts the rear wheel. The resilient return member can be a spring.

As the rider depresses the pedal and then removes his foot from the pedal, the electric motor drive is, respectively, turned on and off via control means which can be a switch interconnected between the motor and the battery. When the pedal is depressed, the switch turns on the motor and the drive wheel on the shaft of the motor engages the rear wheel, propelling the scooter forward. When the pedal is released, the action of the return spring causes the pedal to return to its inactive position and stop contact of the drive wheel with the rear wheel, thereby turning off the motor.

The force transmission means to transmit force from the motor to the rear wheel of the scooter can be a friction-type drive wheel disposed on the shaft of the motor. The drive wheel of the force transmission can be made of rubber, neoprene, metal or other equivalent suitable material. The control means can be in the form of a switch interconnecting the motor with the battery for turning the motor on and off, and such switch can be a leaf switch, pressure switch, touch switch or other equivalent type of switch. The scooter steering mechanism can include a steering handle, a post ending in a yoke with the front wheel rotatably fixed therein. The scooter can also include means for adjusting the height of the post and means for folding the scooter for storage.

DESCRIPTION OF THE PREFERRED EMBODIMENT(S)

Figure 1:
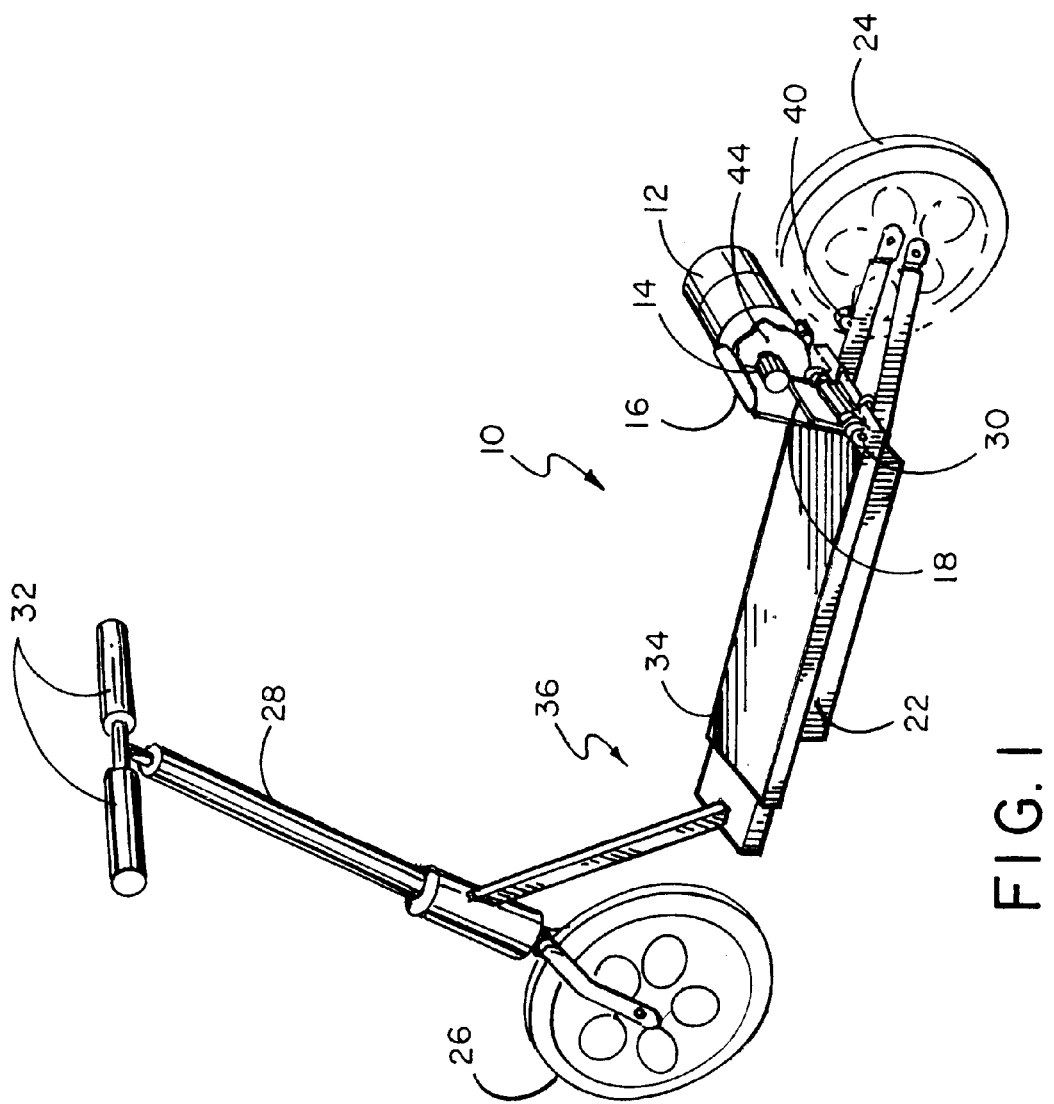
FIG. 1 illustrates a perspective view of the electrically powered scooter of this invention.
Figure 2:
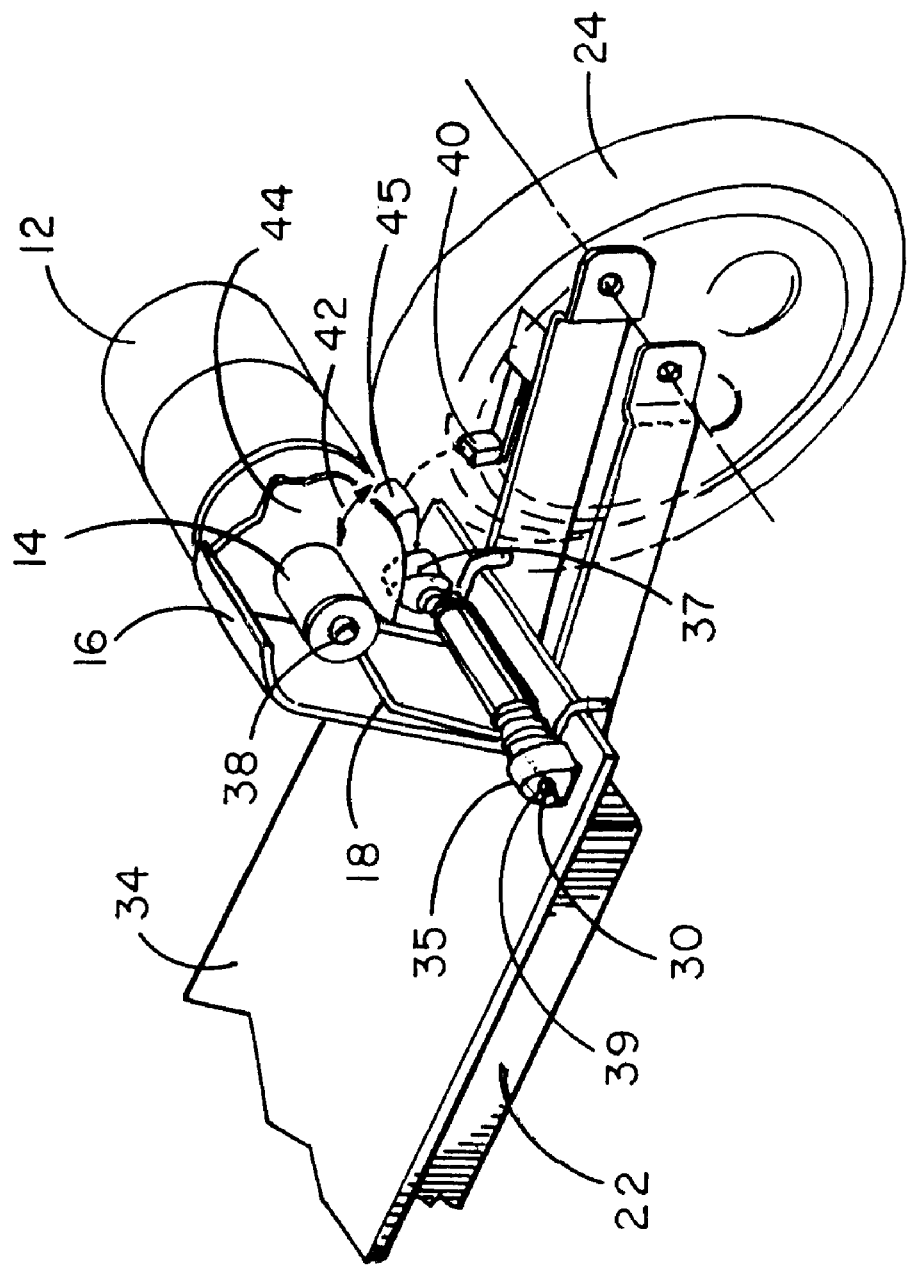
FIG. 2 illustrates a perspective view of the rear wheel and drive mechanism of the electrically powered scooter of this invention.

FIG. 1 illustrates a perspective view of scooter 10 of this invention having front wheel 26 mounted in a yoke on post 28 surmounted by a typical steering handle 32, all of which are attached to chassis 36 which extends back and is attached to rear wheel 24. Some scooters incorporating the present invention can be of the collapsible type with folding front posts. On top of the central section of chassis 36 is platform 34 on which the rider stands. Beneath platform 34 is battery 22. Disposed at the rear end of platform 34 is pedal 16 which is pivotably attached at its base to platform 34 by pivot shaft 30 such that the rider of the scooter, when desired, can apply foot pressure against pedal 16 and depress the pedal rearwardly, pivoting it downward, as described below. As seen in FIG. 2, pivot shaft 30 is held at each end by first and second projections 35 and 37 from platform 34 which projections have apertures defined therein, such as first aperture 39 to receive pivot shaft 30 therein. Pedal 16 is held in an inactive position, as seen in FIG. 1, by the stiffness of spring 18 which holds the pedal upright in a first inactive position so that drive wheel 14 is not in contact with rear wheel 24 with which it is aligned. When pedal 16 is depressed rearward by the pressure of the rider's foot thereagainst, it pivots on pivot shaft 30, causing spring 18 to bend rearward until drive wheel 14 comes in contact with rear wheel 24 with which it is aligned. Spring 18 can have its first end attached to platform 34, then coil around pivot shaft 30 next to first projection 35, then extend upwards against the rear of pedal 16, then extend horizontally across the rear of pedal 16 to a point where it extends downward to where it coils around pivot shaft 30 next to second projection 37 from where it extends to attach again to platform 34. At this point switch 40, as seen in FIG. 2, is turned on by contact with switch activation projection 45 positioned on bracket 44 caused by the movement of pedal 16, directing power from battery 22 to motor 12 which action rotates drive wheel 14 as drive wheel 14 is positioned on shaft 38 of motor 12 which shaft is parallel to the axis of rear wheel 24. Motor 12 is held on by bracket 44 attached to the rear of pedal 16. In some embodiments the motor could be displaced from being perpendicular to the shaft by gears. When the rotating drive wheel 14 comes in contact with rear wheel 24, it propels the scooter forward. When foot pressure is released from pedal 16, spring 18, being resilient in nature, returns to its first inactive position, pushing pedal 16 and its attached drive wheel 14 forward away from contact with rear wheel 24 so that rear wheel 24 is no longer driven by motor 12. At the same time switch 40 is turned off by such pedal's forward movement as it is no longer held in a biased "on" position by being depressed by switch activation projection 45. This action cuts power to motor 12 so that it ceases operation; and drive wheel 14 no longer rotates. This cutting off of power preserves the life of battery 22.

The present invention represents a significant advance over prior art scooters. Simple and easy control is achieved by mounting the motor and drive wheel on a spring-loaded pedal pivotably attached to the rear section of the chassis, and the forward movement of the scooter is easily controlled by depressing pedal 16 with one foot. By depressing the pedal with his foot, the rider turns on the motor and brings the drive wheel of the motor into contact with the rear wheel. Removing the foot from the pedal disengages the drive wheel of the motor from the rear wheel, and the switch turns off the motor. The electrically powered scooter of this invention allows for free wheeling without motor drag since, when the motor is turned off, the drive wheel is separated from the rear wheel by clearance space 42 and is not in contact with the rear wheel. Power to the rear wheel can be turned on and regulated as necessary by the rider to optimize coasting. Coasting is desirable as it is drag-free, allowing the scooter to cover an optimum distance between applications of motor power so as to extend the distance traveled between battery rechargings.

Although the present invention has been described with reference to particular embodiments, it will be apparent to those skilled in the art that variations and modifications can be substituted therefor without departing from the principles and spirit of the invention.

I claim:

1. A scooter of the type having a chassis having a front section, a central section and a rear section for support of a rider thereon; a front wheel disposed at said front section of sad chassis, said front wheel attached to a steering mechanism; a rear wheel having an axis disposed at said rear section of said chassis; a platform having a rear, a top and a bottom, said platform disposed on said central portion of said chassis on which platform said rider stands; a battery disposed under said platform wherein the improvement comprises:

a pedal hingeably attached to said rear of said platform;

a bracket attached to said pedal;

a switch activation projection attached to said bracket;

a spring member attached at the rear of said platform, said spring member urging against the rearward movement of said pedal for holding said pedal in a first inactive position;

a motor attached to said pedal by said bracket, said motor powered by said battery;

a drive wheel attached to said motor, said drive wheel being aligned with, but not contacting, said rear wheel of said scooter when said pedal is in a first inactive position;

said pedal being maneuverable by pressure from said rider's foot to a second active position, causing a rearward bending of said spring member and contact of said drive wheel with said rear wheel; said spring member, when foot pressure is removed from said pedal, returning said pedal to its first inactive position, thereby displacing said drive wheel away from contact with said rear wheel; and a switch interposed between said motor and said battery, said switch biased off when said pedal is in its first inactive position, cutting power from said battery to said motor; and said switch biased on when said pedal is in its second active position being depressed by the rider's foot, causing said switch activation projection on said bracket to bias said switch on and direct power from said battery to said motor for rotating said drive wheel against said rear wheel to propel said scooter forward.

* * * * *